United States Patent
Boecker et al.

(10) Patent No.: US 7,295,147 B2
(45) Date of Patent: Nov. 13, 2007

(54) SENSOR ARRANGEMENT AND METHOD FOR REGULATING THE DISTANCE OF MOTOR VEHICLES

(75) Inventors: Juergen Boecker, Stuttgart (DE); Goetz Braeuchle, Reichartshausen (DE)

(73) Assignee: Robert Bosch GmbH, Stuttgart (DE)

( * ) Notice: Subject to any disclaimer, the term of this patent is extended or adjusted under 35 U.S.C. 154(b) by 192 days.

(21) Appl. No.: 10/527,180

(22) PCT Filed: Mar. 12, 2003

(86) PCT No.: PCT/DE03/00783

§ 371 (c)(1),
(2), (4) Date: Sep. 6, 2005

(87) PCT Pub. No.: WO2004/027450

PCT Pub. Date: Apr. 1, 2004

(65) Prior Publication Data

US 2006/0092073 A1 May 4, 2006

(30) Foreign Application Priority Data

Sep. 7, 2002 (DE) ................. 102 41 456

(51) Int. Cl.
*G01S 13/93* (2006.01)

(52) U.S. Cl. .................. 342/70; 342/71; 342/72; 342/107; 342/117; 342/129; 342/145; 342/146

(58) Field of Classification Search ............ 342/70–72, 342/107, 117, 118, 126, 128, 129, 134, 145–147; 180/167, 169; 340/435–437, 901–905; 700/300, 700/301, 45

See application file for complete search history.

(56) References Cited

U.S. PATENT DOCUMENTS

| | | | | |
|---|---|---|---|---|
| 3,778,823 A * | 12/1973 | Sato et al. | ................... | 342/72 |
| 5,045,856 A * | 9/1991 | Paoletti | ........................ | 342/70 |
| 5,959,571 A | 9/1999 | Fukuchi et al. | ............... | 342/70 |
| 6,031,484 A * | 2/2000 | Bullinger et al. | ............. | 342/72 |
| 6,043,772 A * | 3/2000 | Voigtlaender et al. | ........ | 342/70 |
| 6,055,042 A * | 4/2000 | Sarangapani | ............... | 356/4.01 |
| 6,184,819 B1 * | 2/2001 | Adomat et al. | ............. | 342/127 |
| 6,335,700 B1 * | 1/2002 | Ashihara | ...................... | 342/70 |
| 6,380,884 B1 * | 4/2002 | Satou et al. | .................. | 342/70 |
| 6,664,918 B2 * | 12/2003 | Paradie et al. | ................. | 342/70 |
| 6,727,844 B1 * | 4/2004 | Zimmermann et al. | ....... | 342/70 |
| 6,873,251 B2 * | 3/2005 | Schiffman et al. | .......... | 340/436 |
| 7,012,560 B2 * | 3/2006 | Braeuchle et al. | ............ | 342/70 |
| 7,068,211 B2 * | 6/2006 | Oswald et al. | ................ | 342/70 |

(Continued)

FOREIGN PATENT DOCUMENTS

DE    44 12 770    10/1995

(Continued)

*Primary Examiner*—John B Sotomayor
(74) *Attorney, Agent, or Firm*—Kenyon & Kenyon LLP

(57) ABSTRACT

A sensor system on motor vehicles for locating objects in front of the vehicle, wherein at least two sensors, each having a locating depth of at least 50 m, are arranged in such a way on both sides of longitudinal center axis of the vehicle that their locating angular ranges together cover the entire vehicle width as of a first distance d1, and overlap each other as of a second distance d2.

11 Claims, 3 Drawing Sheets

U.S. PATENT DOCUMENTS

| | | | |
|---|---|---|---|
| 2003/0030583 A1* | 2/2003 | Finn | 342/70 |
| 2003/0128153 A1* | 7/2003 | Paradie et al. | 342/70 |
| 2003/0201929 A1* | 10/2003 | Lutter et al. | 342/52 |
| 2004/0012516 A1* | 1/2004 | Schiffman et al. | 342/70 |
| 2005/0062615 A1* | 3/2005 | Braeuchle et al. | 340/903 |
| 2006/0092073 A1* | 5/2006 | Boecker et al. | 342/70 |

FOREIGN PATENT DOCUMENTS

| | | |
|---|---|---|
| DE | 199 49 409 | 4/2001 |
| EP | 0 957 376 | 11/1999 |

* cited by examiner

SENSOR ARRANGEMENT AND METHOD FOR REGULATING THE DISTANCE OF MOTOR VEHICLES

FIELD OF THE INVENTION

The present invention relates to a sensor system on motor vehicles which is used for locating objects in front of the vehicle, as well as a method for distance control with the aid of such a sensor system.

BACKGROUND INFORMATION

Motor vehicles are frequently equipped with a so-called ACC system that permits distance control, i.e. an adaptive cruise control. This system includes a distance sensor, e.g. a radar sensor or, alternatively, also a lidar sensor, with which it is possible to measure the distances to objects located in front of the vehicle. In the case of a radar sensor, it is also possible to directly measure the relative speeds. When the sensor detects a target object, e.g. a preceding vehicle, the speed of one's own vehicle is automatically adjusted so that the preceding vehicle is followed at an appropriate safety distance. When no relevant target object is detected, the speed is regulated to a desired speed selected by the driver.

In conventional systems of this type, a single radar sensor, e.g. an FMCW (frequency modulated continuous wave) radar is mounted in the middle on the front end of the vehicle, so that its optical axis coincides with the longitudinal center axis of the vehicle. The locating depth of the sensor is, for example, up to 200 m, and the locating angular range is, for example, 7° to each side of the optical axis. Within this locating angular range, the radar system has a certain angular resolution, so that based on the measured locating angle in conjunction with the measured object distance, it is possible to decide whether an object is in the same lane as one's own vehicle or in an adjacent lane. The known ACC systems in use are provided for driving with relatively high cruising speed and correspondingly large distances between vehicles on superhighways and highways that have been enlarged well, and function very reliably in this field of application. However, in traffic situations in which the driving is at lower speed and there are correspondingly smaller distances between vehicles, the problem occurs that relatively large blind spots exist on both sides of the locating angular range of the radar sensor, since the locating range of the radar first covers the entire vehicle width as of a distance of approximately 8 to 10 m. In the case of very small distances between vehicles, there is therefore the danger that vehicles traveling in an offset manner can no longer be detected, or vehicles cutting in suddenly from the side cannot be detected in time.

It would be desirable, however, to extend the application range of the distance control system to smaller distances between vehicles as well, so that, for example, a so-called stop and go control can be implemented making it possible, for example, during operation in traffic congestion to automatically brake one's own vehicle to a standstill and, when the preceding vehicle drives off again, to automatically control the renewed drive-off of one's own vehicle. Until now, an additional short-range sensor system was needed for this purpose. For example, DE 199 49 409 describes a distance sensor system having two additional distance-resolution short-range radar sensors which are mounted to the right and to the left on the bumper of the vehicle and, given a relatively small locating depth, have a locating angular range of 70° to each side. In the relatively large overlap region of these locating angular ranges, the azimuth angle of an object detected by both sensors can then be determined by triangulation. However, not only is a high installation expenditure requisite for this additional short-range sensor system, but a completely new type of sensor technology and suitably adapted evaluation algorithms becomes necessary as well.

SUMMARY OF THE INVENTION

In contrast, the sensor system of the present invention offers the advantage that it is possible to achieve a considerable reduction in the blind spots on both sides of the vehicle using conventional sensors that are already tried and proven, and with comparatively insignificant modifications of the evaluation algorithms. Further advantages are that the redundancy and therefore the reliability of the sensor system is increased, and certain malfunctions, for example, due to sensor misalignment or due to temporary blinding of a sensor caused by snowfall, can be recognized substantially more easily and reliably during continuous operation.

In the sensor system according to the present invention, two conventional long-range sensors are positioned in such a way on both sides of the longitudinal center axis of the vehicle that their locating angular ranges together cover the entire vehicle width as of a first distance d1, and overlap one another as of a second distance d2. This arrangement makes it possible to substantially shorten the blind spots to the right and left of the locating ranges, so that, for example, a stop and go control can be implemented without an additional short-range sensor system, although the locating angular range of each individual sensor is, for example, only ±7°. However, in the case of a particularly cost-effective design approach using just precisely two sensors, an additional blind spot then results in front of the center of the vehicle. This blind spot is relatively small, however, and the case, which is thus anyway very unlikely, that a narrow preceding vehicle, e.g. a two-wheeler, will disappear in this blind spot can be taken into account by a simple adaptation of the method for distance control. In this context, use is made in particular of the circumstance that an object cannot get into this blind spot without it having been detected by at least one of the sensors beforehand.

The further away the two sensors are situated from the longitudinal center axis of the vehicle, the smaller the two outer blind spots become, and the larger the blind spot in front of the vehicle center becomes. The exact lateral position of the sensors must therefore be selected so that a reasonable compromise is achieved. For sensors having a locating angular range of ±7°, the arrangement of the sensors may be selected, for example, so that distance d1, starting from which the two locating angular ranges together cover the entire vehicle width, is only 3 m, and distance d2 from which the locating angular ranges overlap is 5 m. The lateral distance between the two sensors is then approximately 1.2 m, so that in any case only objects whose width is less than this value are able to get into the blind spot in front of the vehicle center. In general, these objects can only be two-wheelers. In practice, a further virtual shortening of the blind spot results because two-wheelers, in contrast to passenger cars, are very structured, so that the radar waves are also reflected at structures in the front region of the vehicle, e.g. at the front protecting plate or at the fork. Particularly when the two-wheeler is offset laterally with respect to the optical axis of the sensor, the two-wheeler can therefore also be located on the basis of these front reflection centers.

The two radar sensors are preferably arranged in such a way that their optical axes run parallel to the longitudinal center axis of the vehicle. Alternatively, however, an arrangement is also conceivable in which the optical axes diverge outwardly, so that the outer blind spots are further reduced in size.

For the extreme short range, e.g. less than 3 m, it is additionally also possible to fall back on commercial parking-assistance sensors such as ultrasonic sensors for object detection.

In the normal distance range, e.g. at distances of 10 m or more, objects in one's own traffic lane are detected using the arrangement of two sensors according to the present invention. This yields the possibility of checking the distance and angle data, measured by the sensors, for their consistency by triangulation, so that, for example, errors in the angular adjustment of one or both sensors may be easily recognized and, optionally, automatically corrected in the signal evaluation. In the same way, a failure or blinding of one of the sensors is immediately recognizable.

Since blind spots occur only at very small distances, e.g. less than 5 m, and on the other hand, vehicle distances of this order of magnitude are only to be expected at very low traveling speeds, the situation that a preceding vehicle will disappear in the blind spot in front of the vehicle center may be mastered simply and without endangering the following traffic in that one's own vehicle is decelerated. As a result of this deceleration, the relative speed of the preceding vehicle should again increase, so that it leaves the blind spot again. If this does not happen, for instance, because the preceding vehicle on its part decelerates or stops, one's own vehicle is further decelerated and ultimately braked to a standstill.

The distinction as to whether the preceding vehicle has disappeared in the blind spot in front of the vehicle center, or else has turned off to the left or to the right, may be made without difficulty when using angular-resolution distance sensors. Alternatively or additionally—for instance for checking purposes—this distinction may also be made, however, on the basis of an extrapolation of the previously detected relative movement of the object. In each case, a relatively rough angular resolution of the radar sensors is sufficient for a reliable distinction, since it only needs to be decided, to which side the object has left the locating range of the sensor in question.

DETAILED DESCRIPTION

Figure 1:
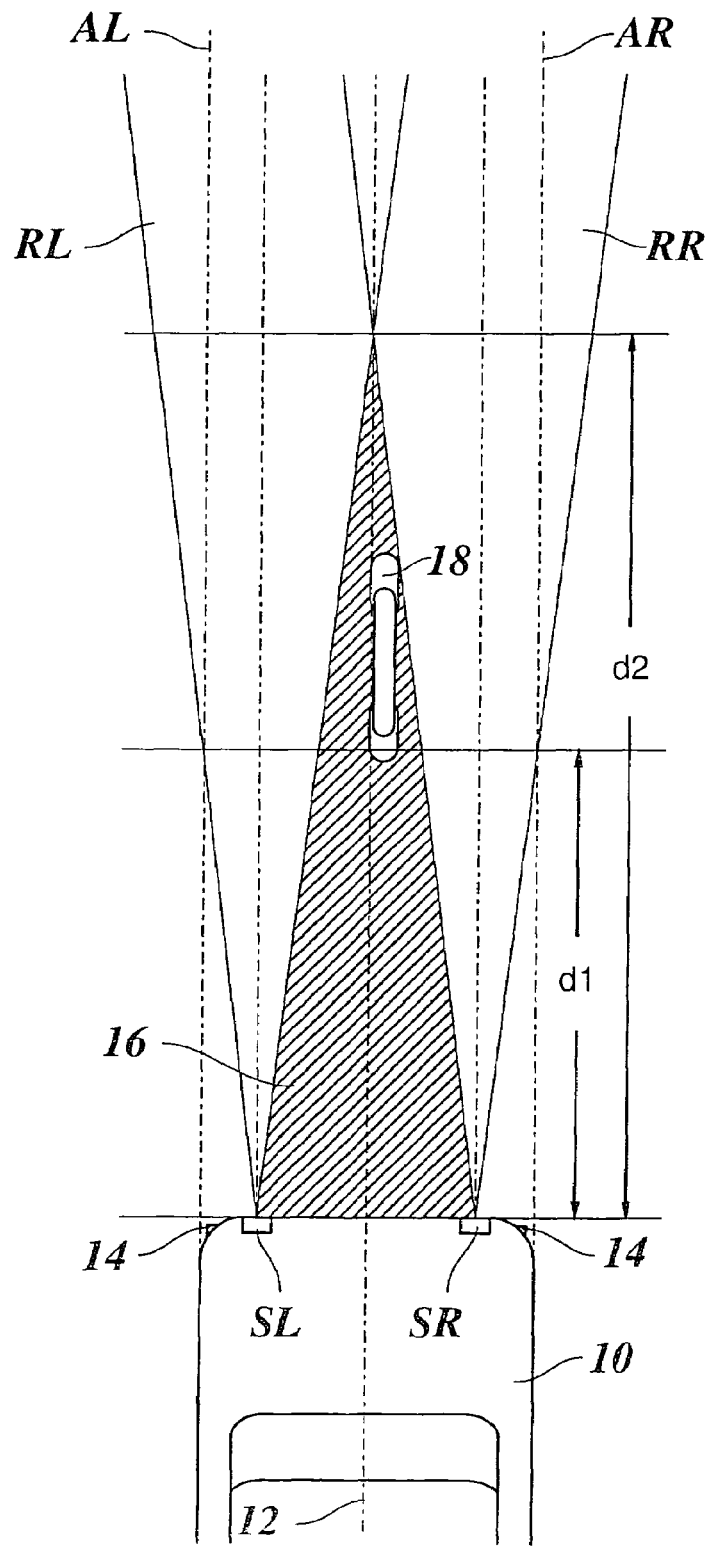
FIG. 1 shows a diagram of a motor vehicle including the sensor system of the present invention and the appertaining locating ranges.

In FIG. 1 at the lower edge, the front end of a vehicle 10 is shown in which, in the region of the front bumper, a sensor system is provided made up of two sensors SR and SL arranged symmetrically with respect to longitudinal center axis 12 of the vehicle. For example, these sensors are angular-resolution FMCW radar sensors which are able to detect the distances and relative speeds of objects in a distance range between 3 m and approximately 200 m. The extreme short range below 3 m is covered by additional parking-assistance sensors 14. Each of the two sensors SR and SL has a locating angular range RR and RL, respectively, of ±7°. Optical axes AR and AL of the two sensors run parallel to longitudinal center axis 12 of the vehicle. The lateral displacement of sensors SR and SL with respect to longitudinal center axis 12 of vehicle 10 is approximately 60 cm. Given a typical vehicle width of 2 m, this means that the two locating angular ranges RR and RL together already cover the entire vehicle width starting from a distance d1 of approximately 3 m. Even vehicles which cut in in front of vehicle 10 very closely from the side may therefore be detected early.

In the middle in front of motor vehicle 10, the two locating ranges RR and RL overlap each other as of a distance d2 of approximately 5 m. Therefore, in front of the vehicle center, between the two locating angular ranges, a blind spot 16 is formed which is shown by hatching in the drawing, and which has the shape of an isosceles triangle having a base width of only 1.2 m. This means that an object 18, e.g. a preceding vehicle or other obstacle, is only able to get completely into the blind spot if its distance to vehicle 10, more precisely, the distance between the baseline of sensors SL, SR and the furthest-forward detectable reflection center of the object is less than 5 m, and if, in addition, the total width of the object is not more than 1.2 m. Thus, in practice, such an object can at most be a two-wheeler, as shown in the drawing.

As soon as object 18 moves somewhat to the right out of the position shown in the drawing, it is detected by sensor SR. In the same way, it is detected by this sensor when the distance between object 18 and vehicle 10 increases slightly. If object 18 moves by a somewhat greater distance to the left, it is detected by sensor SL. Since blind spot 16 is completely framed by locating angular ranges RR and RL and vehicle 10, object 18 cannot leave blind spot 16 without being detected by one of the sensors. Conversely, no target object is able to get into this blind spot without having been detected by at least one of the sensors SR, SL beforehand.

Therefore, with the aid of the sensor system described, it is possible to implement a distance control method in which a selected target object may be reliably tracked even when its distance to one's own vehicle is only on the order of magnitude of approximately 5 m, and in which vehicle 10 is automatically braked to a standstill when, on its part, the tracked target object stops. The essential steps of this method are shown in a flowchart in FIGS. 2(A) and 2(B).

Figure 2A:
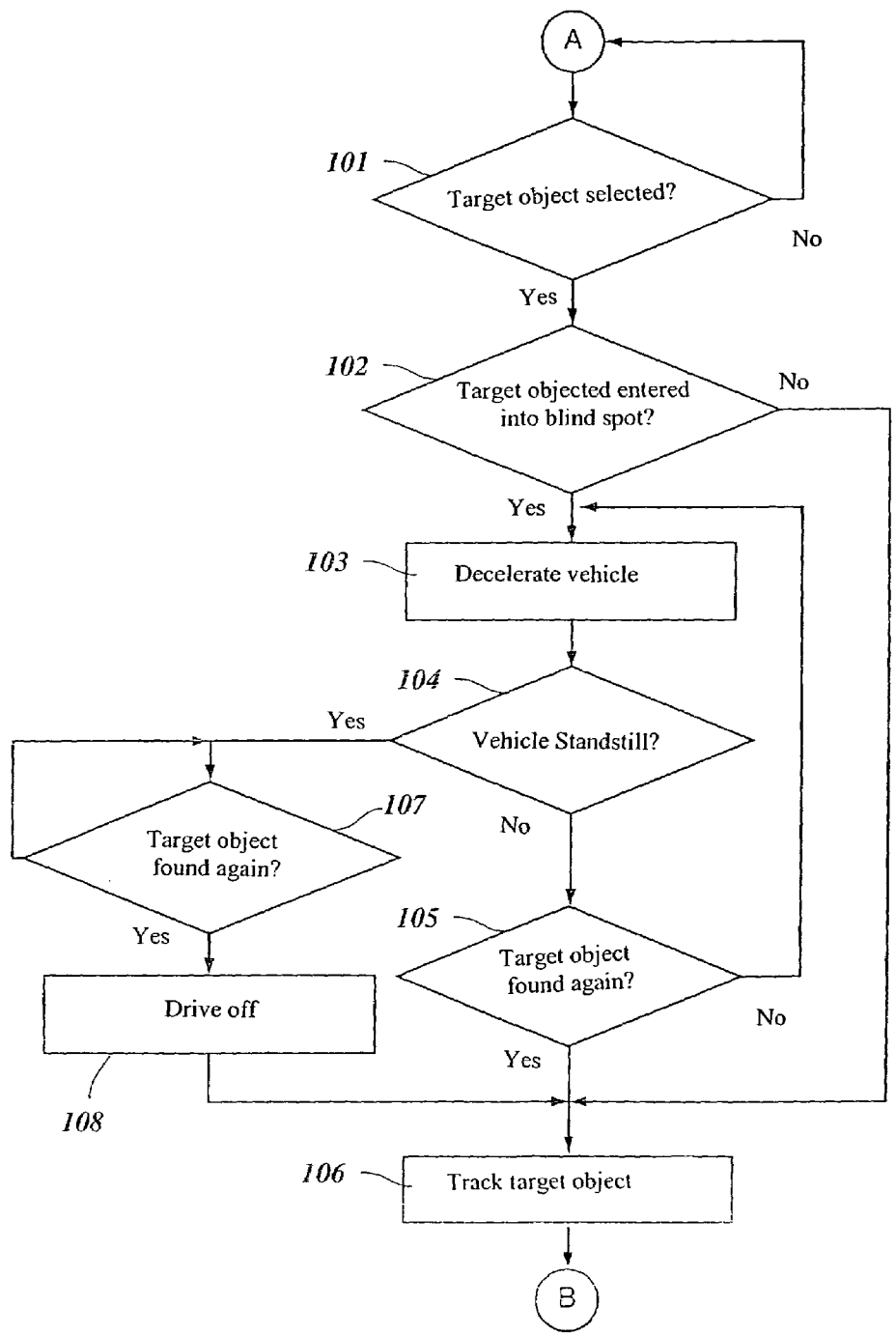
FIGS. 2(A) and 2(B) show a flowchart for a method for distance control.

This flowchart illustrates a procedure which begins at point A in FIG. 2(A), and then is run through cyclically. In this context, it is assumed that the locating data of sensors SR and SL are acquired cyclically, and that the detected objects are identified and tracked from cycle to cycle, and that in each case, the object situated closest to vehicle 10 in its own traffic lane is selected as the target object. In step 101, it is checked whether a target object is present. If this is not the case, there is a return to point A. Otherwise, it is checked in step 102 whether the selected target object has gotten out of range into blind spot 16. In this case, one's own vehicle is decelerated in step 103, so that the target object again gets into the detection range. In step 104, it is then checked whether, as a result of the vehicle deceleration, the vehicle standstill has already commenced. If this is not the case, in step 105 it is checked whether the target object was found again. If yes, this target object is tracked in step 106. If the target object was not found again, there is a return to step 103, and the vehicle is further decelerated. If in the check in step 104 it turns out that the vehicle was braked to a standstill, it is checked in step 107 whether the target object was found again, for example, because the target object was set in motion again and has left the blind spot. This step 107 is optionally repeated until the target object has appeared again. If the target object was found again, a drive-off procedure is triggered in step 108, and thereupon the method is continued with step 106 in order to track the target object.

Figure 2B:
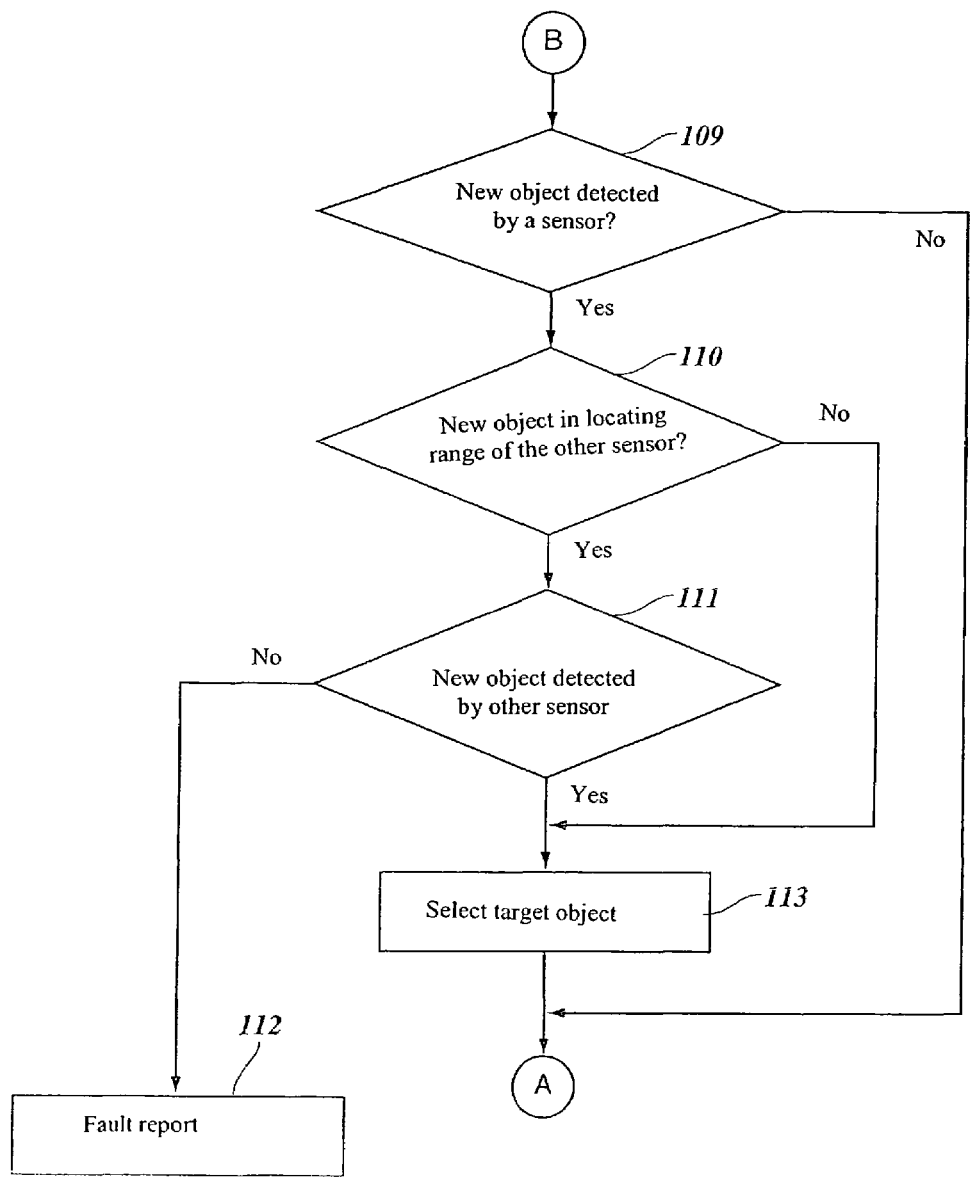

The routine is subsequently continued at point B in FIG. 2(B). In step 109 it is checked whether a new object, for instance, a vehicle cutting in from the side, has entered into the locating range of the sensors. If this is the case, then in step 110, on the basis of the locating data, it is checked for this object whether it is also in the locating range of the other sensor. In this case, in step 111 it is checked whether the new object was also detected by the other sensor. If this is not the case, then this points to a fault in the sensor system, and a fault report is output in step 112.

If it was determined in step 111 that the new object has also been detected by the other sensor, or if it was determined in step 110 that the new object could not be detected by the other sensor, then in step 113 a new target-object selection is carried out, i.e. it is decided whether the newly appeared object replaces the previous target object. Thereupon, there is a return to point A. If it was determined in step 109 that no new object has appeared, the routine branches directly to point A.

A procedure analogous to steps 110 through 113 is also carried out within the framework of object tracking for each tracked object, although this is not shown in the drawing.

What is claimed is:

1. A sensor system on a motor vehicle and for locating an object in front of the motor vehicle, comprising:
   at least two sensors, each having a locating depth of at least 50 m, wherein:
      the at least two sensors are arranged in such a way on both sides of a longitudinal center axis of the motor vehicle that locating angular ranges of the at least two sensors together cover an entire vehicle width as of a first distance, and overlap each other as of a second distance.

2. The sensor system as recited in claim 1, wherein the first distance is less than 5 m.

3. The sensor system as recited in claim 1, wherein the first distance is approximately 3 m.

4. The sensor system as recited in claim 1, wherein the second distance is less than 10 m.

5. The sensor system as recited in claim 1, wherein the second distance is approximately 5 m.

6. The sensor system as recited in claim 1, wherein optical axes of the at least two sensors run parallel to the longitudinal center axis of the motor vehicle.

7. The sensor system as recited in claim 1, wherein the at least two sensors have angular resolution.

8. The sensor system as recited in claim 1, wherein the locating angular range of each of the at least two sensors to each side of its optical axis is less than 10.

9. In a system including at least two sensors arranged in such a way on both sides of a longitudinal center axis of a motor vehicle that below a distance, their locating angular ranges form a blind spot between themselves, a method for distance control in the motor vehicle, comprising:
   when an object that is detected by only one of the at least two sensors leaves the locating angular range of the one of the at least two sensors, determining whether the object has left the corresponding locating angular range and gone into the blind spot; and
   if the object is determined to have gone into the blind spot, decelerating the motor vehicle until one of the object appears again and the motor vehicle is brought to a standstill.

10. The method as recited in claim 9, wherein the determining step is performed made on the basis of locating angle data of the at least two sensors.

11. The method as recited in claim 10 further comprising:
   for an object that is in the locating angular range of one of the at least two sensors, checking, on the basis of locating angle data of the one of the at least two sensors in whose locating angular range the object is present, whether the object is in the locating angular range of another one of the at least two sensors; and
   if the object is in the locating angular range of the other one of the at least two sensors but is not located by the other one of the at least two sensors, outputting a fault report.

* * * * *